(12) United States Patent
Yamazaki et al.

(10) Patent No.: US 10,923,280 B2
(45) Date of Patent: Feb. 16, 2021

(54) FILM CAPACITOR, COMBINATION TYPE CAPACITOR, INVERTER, AND ELECTRIC VEHICLE

(71) Applicant: KYOCERA Corporation, Kyoto (JP)

(72) Inventors: Youichi Yamazaki, Kirishima (JP); Naoki Kikuchi, Kirishima (JP); Yoshihiro Nakao, Katano (JP)

(73) Assignee: Kyocera Corporation, Kyoto (JP)

(*) Notice: Subject to any disclaimer, the term of this patent is extended or adjusted under 35 U.S.C. 154(b) by 220 days.

(21) Appl. No.: 16/256,719

(22) Filed: Jan. 24, 2019

(65) Prior Publication Data
US 2019/0172642 A1 Jun. 6, 2019

Related U.S. Application Data

(63) Continuation-in-part of application No. PCT/JP2017/027067, filed on Jul. 26, 2017.

(30) Foreign Application Priority Data

Jul. 26, 2016 (JP) .............................. JP2016-146448
Aug. 30, 2016 (JP) .............................. JP2016-168130
Sep. 28, 2016 (JP) .............................. JP2016-189803

(51) Int. Cl.
*H01G 4/18* (2006.01)
*H01G 4/015* (2006.01)
(Continued)

(52) U.S. Cl.
CPC .............. *H01G 4/18* (2013.01); *H01G 4/012* (2013.01); *H01G 4/015* (2013.01); *H01G 4/32* (2013.01);
(Continued)

(58) Field of Classification Search
CPC .......... H01G 4/015; H01G 4/012; H01G 4/38; H01G 4/32; H01G 4/18; H01G 4/33; H02M 7/5387
See application file for complete search history.

(56) References Cited

U.S. PATENT DOCUMENTS

| | | | |
|---|---|---|---|
| 2,683,792 A | 7/1954 | Dubilier | |
| 2007/0109715 A1* | 5/2007 | Azuma | B60L 15/007 361/299.3 |
| 2017/0294269 A1* | 10/2017 | Saito | B32B 27/08 |

FOREIGN PATENT DOCUMENTS

| | | | |
|---|---|---|---|
| JP | 50-004563 A | 1/1975 | |
| JP | 51-125854 A | 11/1976 | |

(Continued)

*Primary Examiner* — David M Sinclair
(74) *Attorney, Agent, or Firm* — Volpe Koenig

(57) ABSTRACT

A film capacitor includes a main body portion and external electrodes. The main body portion includes a dielectric film and a metal film that is disposed on one surface of the dielectric film. The metal film has surface roughnesses of S1 and S2 where S1 denotes a surface roughness of the metal film in a first direction, and S2 denotes a surface roughness of the metal film in a second direction. The first direction is perpendicular to the second direction. S1 is greater than S2. The main body portion includes a pair of ends in the first direction thereof. The external electrodes are disposed on the pair of ends in the first direction of the main body portion, respectively. An average value of fractal dimensions of irregularity boundary lines due to wrinkles of the metal film is 1.08 or more.

15 Claims, 9 Drawing Sheets

(51) Int. Cl.
*H01G 4/012* (2006.01)
*H01G 4/38* (2006.01)
*H02M 7/48* (2007.01)
*H01G 4/32* (2006.01)
*H01G 4/33* (2006.01)
*H02M 7/5387* (2007.01)

(52) U.S. Cl.
CPC ............... *H01G 4/33* (2013.01); *H01G 4/38* (2013.01); *H02M 7/48* (2013.01); *H02M 7/5387* (2013.01)

(56) References Cited

FOREIGN PATENT DOCUMENTS

| | | | | |
|---|---|---|---|---|
| JP | 59-152729 U | | 10/1984 | |
| JP | 10308323 A | * | 11/1998 | ............ H01G 4/015 |
| JP | 4487817 B2 | * | 6/2010 | |
| JP | 2013-207158 A | | 10/2013 | |
| JP | 2015-053331 A | | 3/2015 | |
| JP | 2015-142099 A | | 8/2015 | |
| JP | 2015-201527 A | | 11/2015 | |

* cited by examiner

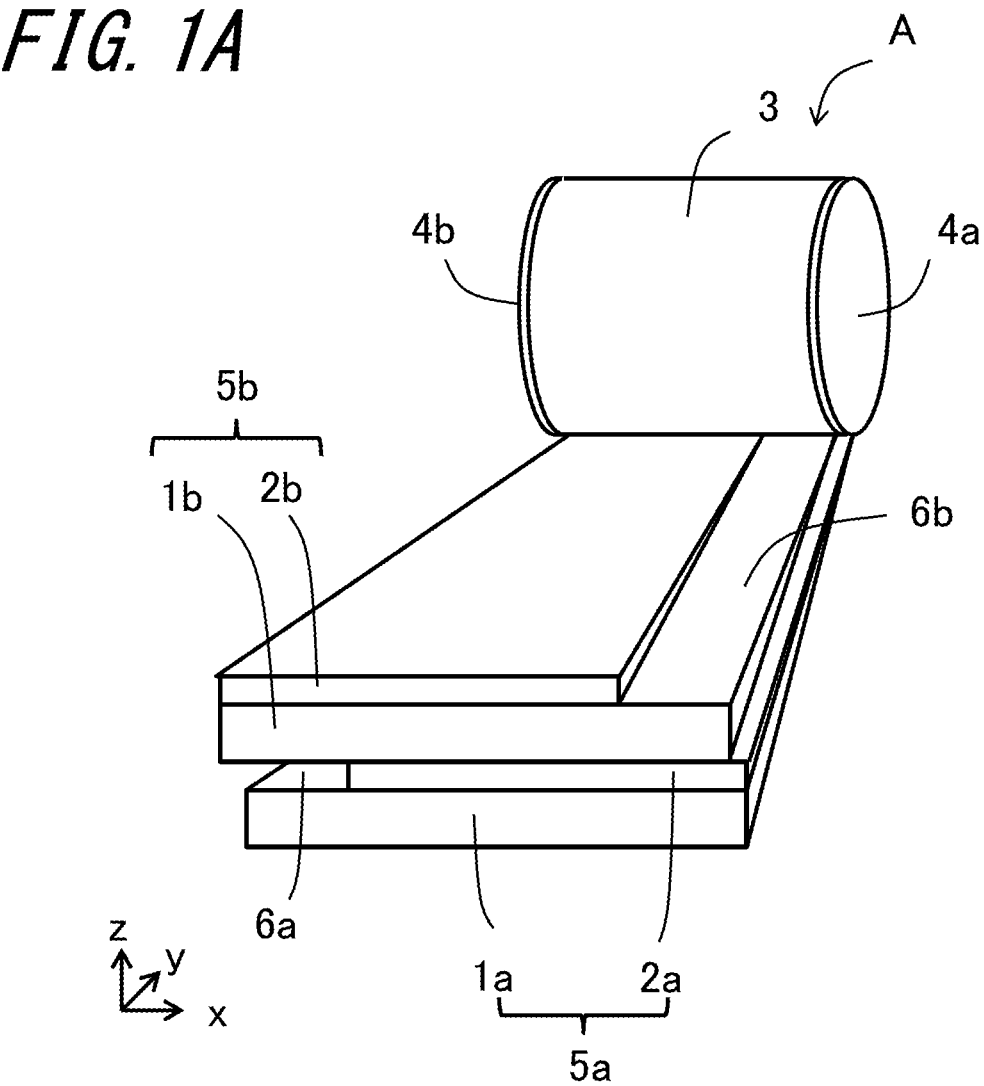

FILM CAPACITOR, COMBINATION TYPE CAPACITOR, INVERTER, AND ELECTRIC VEHICLE

CROSS-REFERENCE TO RELATED APPLICATIONS

This application is a continuation-in-part application of International Application No. PCT/JP2017/027067 filed on Jul. 26, 2017, which claims priority to Japanese Patent Application Nos. 2016-146448 filed on Jul. 26, 2016, 2016-168130 filed on Aug. 30, 2016, and 2016-189803 filed on Sep. 28, 2016, the contents of which are incorporated herein by reference in its entirety.

TECHNICAL FIELD

The present disclosure relates to a film capacitor, a combination type capacitor, an inverter, and an electric vehicle.

BACKGROUND ART

A film capacitor has a metal film vapor-deposited on a surface of a dielectric film, which is a film of, for example, polypropylene resin, as an electrode. Owing to such a configuration, the film capacitor has an advantage in preventing a breakdown (self-healing property).

Hence, attention is being paid to the film capacitor as to a capability of preventing ignition or electric shock in the event of a short circuit of an electrical circuit, and applications of the film capacitor are expanding in recent years from a power-supply circuit of an LED (Light Emitting Diode) light to a motor drive of a hybrid automobile and an inverter system of solar power generation.

The self-healing property of the film capacitor as described above is exerted when a short circuit occurs in an insulation defect portion and the metal film in the vicinity of the defect portion evaporates and spatters due to energy of the short circuit. A gas is produced when the metal film evaporates and spatters. Hence, gas releasing performance is crucial to let the self-healing property function. In particular, a gas is not released easily in the vicinity of a so-called insulation margin where adjacently-located dielectric films adhere firmly to each other, and therefore, a method of ensuring gas releasing performance by increasing a surface roughness of the dielectric film in the margin is disclosed in, for example, Patent Literature 1. Also, Patent Literature 2 discloses that slipperiness of a film is improved by providing irregularities to the surface of the dielectric film and increasing the surface roughness, by which an effect of reducing surface friction resistance when a film capacitor is formed by winding the dielectric film with the metal film can be obtained.

CITATION LIST

Patent Literature

Patent Literature 1: Japanese Unexamined Patent Publication JP-A 2015-201527
Patent Literature 2: Japanese Unexamined Patent Publication JP-A 2013-207158

SUMMARY OF INVENTION

A film capacitor of the present disclosure includes a main body portion and external electrodes. The main body portion includes a dielectric film and a metal film that is disposed on one surface of the dielectric film. The metal film has surface roughnesses of S1 and S2 where S1 denotes a surface roughness of the metal film in a first direction, and S2 denotes a surface roughness of the metal film in a second direction. The first direction is perpendicular to the second direction. S1 is greater than S2. The main body portion includes a pair of ends in the first direction thereof. The external electrodes are disposed on the pair of ends in the first direction of the main body portion, respectively. An average value of fractal dimensions of irregularity boundary lines due to wrinkles of the metal film is 1.08 or more.

A combination type capacitor of the present disclosure includes a plurality of film capacitors, and at least one bus bar connecting all of the plurality of film capacitors, the plurality of film capacitors including any one of the film capacitors described above.

An inverter of the present disclosure includes a bridge circuit including switching elements, and a capacitance member connected to the bridge circuit, the capacitance member including any one of the film capacitors described above or the combination type capacitor described above.

An electric vehicle of the present disclosure includes a power supply; the above-described inverter connected to the power supply; a motor connected to the inverter; and a wheel driven by the motor.

BRIEF DESCRIPTION OF DRAWINGS

FIG. 1A is a developed perspective view schematically showing a configuration of a wound type film capacitor;

DESCRIPTION OF EMBODIMENTS

Figure 1B:
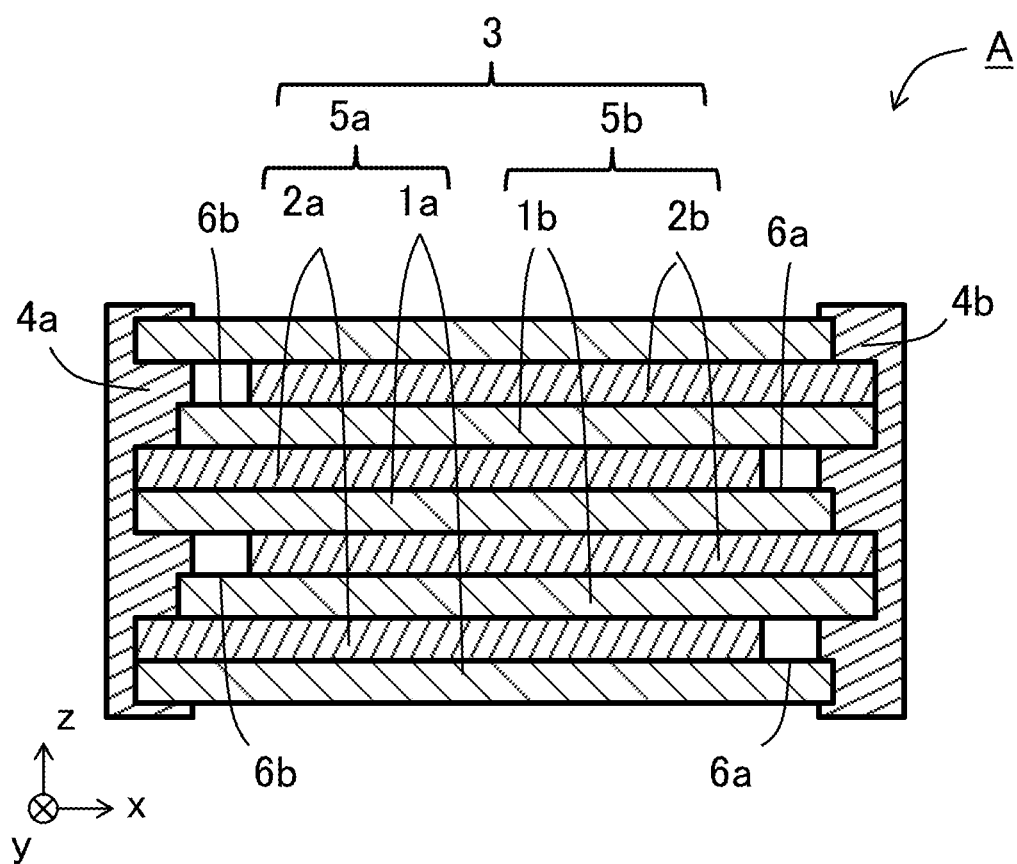
FIG. 1B is a schematic cross-sectional view of a laminated type film capacitor.

A film capacitor A shown in FIG. 1A includes a main body portion 3 in which a dielectric film 1a, a metal film 2a, another dielectric film 1b, and another metal film 2b are laminated in this order and a laminate is wound, and metallikon electrodes which are a pair of external electrodes 4a and 4b provided at opposing end faces of the main body portion 3 in an axial length direction (first direction) thereof. In FIG. 1A, in order to facilitate understanding, thicknesses of the dielectric films 1a and 1b and the metal films 2a and 2b which are drawn out are drawn to be thicker as they go forward in the plane of paper. Small letters "a" and "b" may be omitted from numerals denoting the dielectric films and the metal films where appropriate.

A film capacitor A shown in FIG. 1B includes a main body portion 3 in which a dielectric film 1a, a metal film 2a, another dielectric film 1b, and another metal film 2b are laminated in this order, and metallikon electrodes which are a pair of external electrodes 4a and 4b provided at opposing end faces of the main body portion 3 in a first direction thereof. The main body portion 3 shown in FIG. 1B is, obtained by, for example, dividing a ring-shaped wound body at a predetermined interval in the circumferential direction.

In FIGS. 1A and 1B, a width direction of the dielectric films 1a and 1b and the metal films 2a and 2b is given as an x direction (first direction), a length direction thereof is given as a y direction (second direction), and a thickness direction thereof is given as a z direction. As to the main body portion 3 as a wound body, an axial length direction may be given as the x direction (first direction), a winding circumferential direction may be given as the y direction (second direction), and a winding radial direction may be given as the z direction.

A metalized film 5a is formed by providing the metal film 2a on one surface of the dielectric film 1a and has a so-called insulation margin 6a where the dielectric film 1a is exposed to a part of the one surface. The insulation margin 6a is provided at one end of the metalized film 5a in a width direction (x direction) continuously in a longitudinal direction (y direction). A metalized film 5b is formed by providing the metal film 2b on one surface of the dielectric film 1b and has a so-called insulation margin 6b where the dielectric film 1b is exposed to a part of the one surface. The insulation margin 6b is provided at one end of the metalized film 5b in the width direction (x direction) continuously in the longitudinal direction (y direction). As shown in FIGS. 1A and 1B, the metalized films 5a and 5b are laminated and/or wound while being slightly shifted from each other in the width direction (x direction).

In this manner, the film capacitor A has the metalized film 5a including the dielectric film 1a and the metal film 2a and the metalized film 5b including the dielectric film 1b and the metal film 2b, which are laminated and/or wound as shown in FIGS. 1A and 1B.

The metal films 2a and 2b are connected to the external electrodes 4a and 4b in connection portions exposed to different ends in the first direction (x direction) of the main body portion 3, respectively.

First Embodiment

A metal film 2 of a first embodiment of the film capacitor A has irregularities on a surface thereof. Here, a surface roughness of the metal film 2 in a width direction (x direction) of a dielectric film 1 is defined as S1, and a surface roughness of the metal film in a length direction (y direction) of the dielectric film 1 is defined as S2. Then, the metal film 2 of the present embodiment has S1 larger than S2 (S1>S2). In other words, the metal film 2 has wrinkles (ridges and grooves) extending in the length direction (y direction) on the surface. The dielectric film 1 has substantially a constant thickness and a variation in thickness is sufficiently small for the surface roughness S1 and S2 of the metal film 2.

By making the surface roughness S1 of the metal film 2 in the width direction (x direction) larger than the surface roughness S2 in the length direction (y direction) in this manner, slipperiness of a metalized film 5 can be improved. By improving slipperiness of the metalized film 5, an occurrence of distortion of the dielectric film 1 can be regulated in, for example, a heat pressing process to make a main body portion 3 flat after the winding. A breakdown electric field (withstand voltage) of the film capacitor A can be thus maintained.

In a case as in FIGS. 1A and 1B where the metal film 2 is provided on only one surface of the dielectric film 1, a surface roughness of the other surface of the dielectric film 1 where no metal film 2 is provided is defined as S3. Then, both S1 and S2 may be larger than S3.

Each of the surface roughnesses S1, S2, and S3 is an arithmetical mean height Sa (in accordance with ISO 25178) and can be measured by, for example, an atomic force microscope (AFM).

Figure 2:
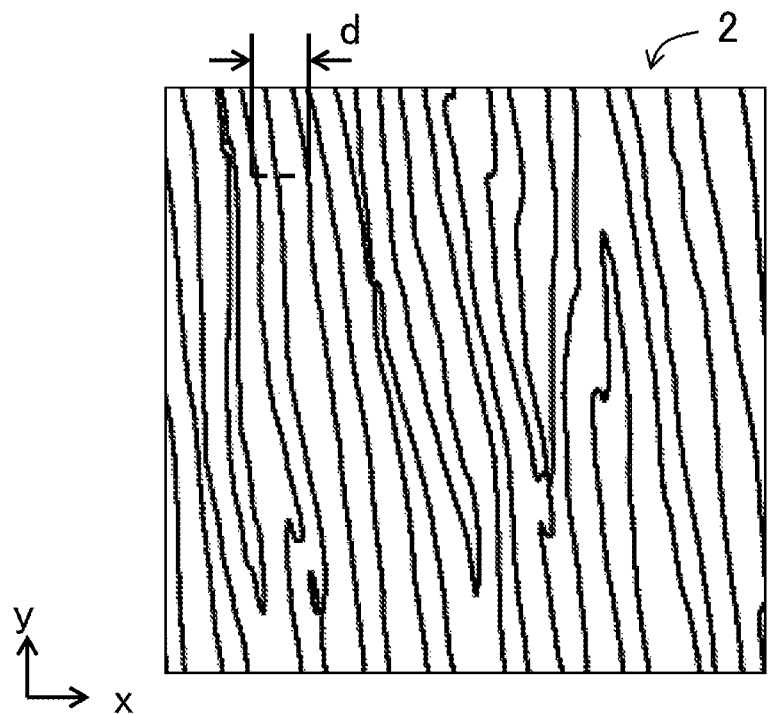
FIG. 2 shows an example of a digitally processed result of an analysis of a metal film by an atomic force microscope (AFM), in which an upper view is a view of a case where a fractal dimension is 1.08 and a lower view is a view of a case where a fractal dimension is 1.23.
Figure 2:
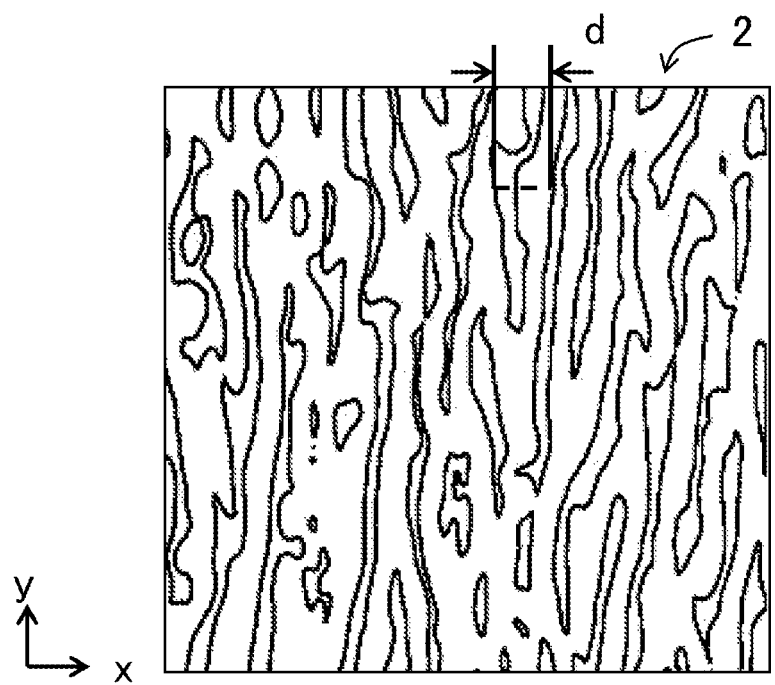

In the present embodiment, an average value of fractal dimensions of irregularity boundary lines of the metal film 2 is 1.08 or more. The fractal dimension is a parameter specifying a complexity of a figure. A fractal dimension of a straight line is 1. A fractal dimension of a curve approaches as the curve meanders and fills a plane. By using the fractal dimension, a complexity of a line (herein, the irregularity boundary line of the metal film 2 as shown in FIG. 2) can be represented by a number. For example, in a case where irregularities are arranged in one direction and the irregularity boundary lines are straight lines, fractal dimensions of the irregularity boundary lines are 1.

Figure 3A:
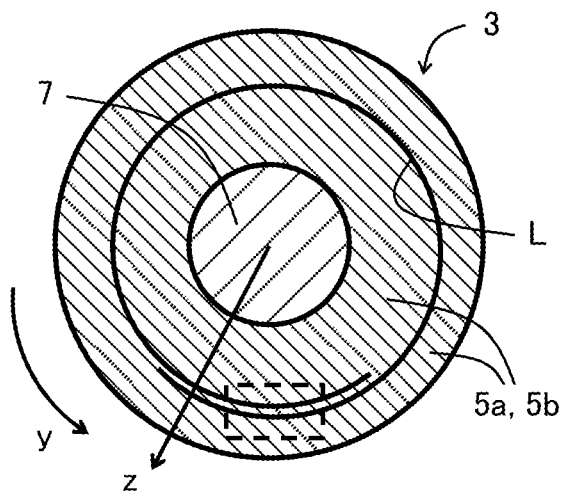
FIG. 3A is a sectional view of a main body portion of a first embodiment taken perpendicularly to an axial length direction thereof.
Figure 3B:
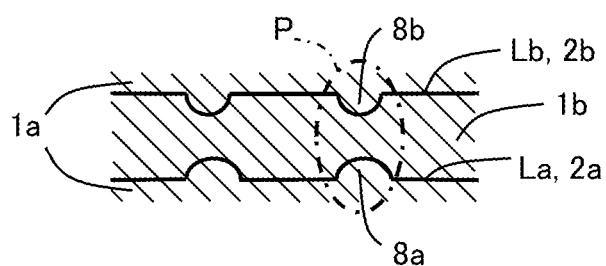
FIG. 3B is an enlarged sectional view of a portion enclosed by a broken line in FIG. 3A.

For example, in a case where irregularities of the metal film 2 are arranged in one direction (particularly, in the width direction (x direction)) and the fractal dimensions are 1, recesses or projections extend in the length direction (y direction) and the recesses or the projections on metalized films 5a and 5b are highly likely to be placed one above the other in a plurality of wound surfaces L (see FIG. 3A). The wound surface L means a surface of the metal film 2 of the wound metalized film 5. Reference numeral 7 denotes a winding core. Further, in the event of misalignment of the metalized film 5 during the winding, the projections of one of the metalized films 5a and 5b and the recesses of the other may possibly be placed one above the other. For example, a portion (P, see FIG. 3B) in which a protrusion 8a of a metal film 2a (wound surface La) and a recess 8b of a metal film 2b (wound surface Lb) are opposed to each other via a dielectric film 1b or a portion (P, not shown) in which a recess of the metal film 2a and a protrusion of the metal film 2b are opposed to each other via a dielectric film 1a is formed, and the dielectric film 1 becomes thinner in the portion P. In the portion P, a breakdown electric field (BDE, a withstand voltage) of the dielectric film 1 decreases due to the thinness of the dielectric film 1. Further, in a state where such a portion P extends in the length direction (y direction) and becomes overlapped one on the other in the plurality of wound surfaces L, a breakdown occurring at any point in the portion P may possibly propagate in the plurality of wound surfaces L.

It is preferable in the present embodiment to set an average value of the fractal dimensions (hereinafter, referred to also simply as the fractal dimension) of the irregularity boundary lines of the metal film 2 to 1.08 or more, in particular, 1.23 or more. By setting the fractal dimension to 1.08 or more, even when the metalized films 5a and 5b are wound, a possibility of formation of the portion (P) in which the projection 8a of the metal film 2a and the recess 8b of the metal film 2b are opposed to each other via the dielectric film 1b or formation of the portion (P) in which the recess 8b of the metal film 2a and the projection 8a of the metal film 2b are opposed to each other via the dielectric film 1a can be reduced. Even when the portion P is formed and extends in the length direction, a possibility that the portion P is overlapped one on the other in the plurality of wound surfaces L can be reduced. A withstand voltage of the film capacitor can be thus maintained high.

The fractal dimension can be determined by a box counting method (see, for example, Japanese Unexamined Patent Publication JP-A 10-144944 (1998)). More specifically, an irregularity image of the surface of the metal film 2 is obtained first by using an atomic force microscope (AFM) or the like. The irregularity boundary lines are obtained by subjecting the obtained irregularity image to binarization with image processing software. The fractal dimension can be calculated by applying the box counting method to the respective irregularity boundary lines thus obtained.

The metal film 2 (2a, 2b) may have a heavy edge structure in the vicinity of a connection portion with an external electrode 4 (4a, 4b). Hereinafter, a portion of the metal film 2 in the vicinity of the connection portion with the external electrode 4 may be referred to also as the heavy edge portion. The heavy edge structure is a structure in which a thickness of the metal film 2 in the vicinity of the connection portion with the external electrode 4 is increased in comparison with a thickness in an effective region where the metal films 2a and 2b are overlapped one on the other. A thickness of the metal film 2 in the heavy edge portion is two to four times larger than the thickness in the effective region.

A thickness of the metal film 2 in the effective region is preferably set to, for example, 20 nm or less, in particular, to a range of 5 nm or more and 15 nm or less. By setting the thickness of the metal film 2 as specified above, area resistance (sheet resistance) of 18 to 50Ω/□ is obtained, which allows the self-healing property to be exerted.

The metal film 2 (2a, 2b) may have the heavy edge structure in the vicinity of the connection portion with the external electrode 4 (4a, 4b). The heavy edge structure is a structure in which resistance of the metal film 2 in the vicinity of the connection portion with the external electrode 4 is reduced in comparison with resistance in the effective region where the metal films 2a and 2b are overlapped one on the other. The heavy edge structure is, normally, a structure in which a thickness of the metal film 2 is increased in the vicinity of the connection portion with the external electrode 4. A thickness of the metal film 2 in the vicinity of the connection portion with the external electrode 4 can be two to four times larger than the thickness in the effective region, that is, a range of 10 to 80 nm.

An average thickness of the metal film 2 may be evaluated by using a scanning electron microscope (SEM) after a cross section of the metalized film 5 is subjected to ion milling.

The surface roughness S1 of the metal film 2 in the width direction may be set to a range of 20 nm or more and 100 nm or less. By setting the surface roughness S1 to 20 nm or more, slipperiness can be ensured and hence an occurrence of distortion of the dielectric film 1 can be regulated in the heat pressing process after the winding. A decrease of the breakdown voltage can be thus regulated. By setting the surface roughness S1 to 100 nm or less, a depth of the recess 8b is limited to a predetermined range for a thickness of the dielectric film 1 and hence influences of the recess 8b to a thickness of the dielectric film 1 can be reduced. A decrease of the breakdown voltage can be thus regulated.

A pitch of the irregularities of the metal film 2 in the width direction may be in a range of 0.01 μm or more and 10 μm or less. Hereinafter, a pitch of the irregularities of the metal film 2 in the width direction may be also referred to simply as the irregularity pitch. The irregularity pitch is a recess-to-recess interval or a projection-to-projection interval. By setting the irregularity pitch to a range of 0.01 μm or more and 10 μm or less, slipperiness of the metalized film 5 can be ensured.

The irregularity pitch of the metal film 2 can be confirmed by using, for example, an atomic force microscope (AFM). For example, an arbitrary 100-μm-long line is drawn in the width direction of the metal film 2 and an interval between projections 8a or between recesses 8b arranged periodically on the line may be confirmed. Alternatively, the irregularity pitch may be confirmed from an interval d between the irregularity boundary lines described above (see FIG. 2) on an arbitrary 100-μm-long line drawn in the width direction of the metal film 2.

Examples of a material of insulating resin used for the dielectric film 1 include polypropylene (PP), polyethylene terephthalate (PET), polyphenylene sulfide (PPS), polyethylene naphthalate (PEN), polyarylate (PAR), polyphenylene ether (PPE), polyetherimide (PEI), and cyclo-olefin polymer (COP). In particular, polyarylate (PAR) has a high breakdown voltage and is therefore preferable.

The metalized film and the film capacitor of the present embodiment may be manufactured as follows.

Firstly, the dielectric film 1 is prepared. The dielectric film 1 is obtained by shaping a resin solution, which is prepared by dissolving, for example, insulating resin in a solvent, in the form of a sheet on a surface of a base made of, for example, polyethylene terephthalate (PET) and by volatilizing a solvent medium by drying (solution-cast method). A shaping method may be selected suitably from known film deposition methods, such as a doctor blade method, a die coating method, and a knife coating method. Examples of a solvent medium preferably used for shaping include methanol, isopropanol, n-butanol, ethylene glycol, ethylene glycol monopropyl ether, methyl ethyl ketone, methyl isobutyl ketone, xylene, propylene glycol monomethyl ether, propylene glycol monomethyl ether acetate, dimethyl acetamide, and cyclohexane, or an organic solvent medium containing a mixture of two or more different solvent media selected from them. Alternatively, a film of resin manufactured by a melt extrusion method may be stretched.

A thickness of the dielectric film 1 may be set to, for example, 5 µm or less. In particular, the dielectric film 1 having a thickness of 0.5 to 4 µm is used preferably.

The dielectric film 1 may be formed of the insulating resin specified above alone or may contain any other material. Examples of a component contained in the dielectric film 1 other than resin include the organic solvent media specified above and an inorganic filler. Examples of the inorganic filler include an inorganic oxide such as alumina, titanium oxide, and silicon dioxide, an inorganic nitride such as silicon nitride, and glass. In particular, when the inorganic filler used is a material having high specific permittivity such as a composite oxide having a perovskite structure, specific permittivity of the entire dielectric film 1 is improved, which can in turn make the film capacitor A more compact. The inorganic filler may be subjected to surface treatment such as silane coupling treatment and titanate coupling treatment, to improve compatibility between the inorganic filler and resin.

In a case where the inorganic filler as described above is used for the dielectric film 1, a composite film containing less than 50 mass % inorganic filler and 50 mass % or more resin is preferable. By containing less than 50 mass % inorganic filler and 50 mass % or more resin, the dielectric film 1 can obtain an effect of improving specific permittivity by the inorganic filler while maintain flexibility of the resin. A size (average particle size) of the inorganic filler may be 4 to 1000 nm.

The metal film 2 is formed on one surface of the manufactured dielectric film 1 by vapor-depositing a metal component such as aluminum (Al). The metalized film 5 is thus obtained.

In a case where the heavy edge structure is formed, the metalized film 5 is masked except for a portion where the heavy edge is to be formed, and, for example, zinc (Zn) is further vapor-deposited onto the portion of the vapor-deposited metal component that is not masked. Herein, the film vapor-deposited as the heavy edge is one to three times thicker than the vapor-deposited metal component.

Subsequently, the metalized film 5 together with the base is subjected to heat treatment at a temperature at which the base contracts. Herein, the dielectric film 1 together with the base is allowed to contract in the width direction (x direction) by applying heat treatment under tension in the length direction (y direction) of the metalized film 5. Unlike the dielectric film 1 and the base, the metal film 2 does not contract in the width direction (x direction). Hence, irregularities extending in the length direction (y direction) are formed on the metal film 2. Consequently, the surface roughness S1 of the metal film 2 in the width direction (x direction) becomes larger than the surface roughness S2 in the length direction (y direction). In addition, by raising a heat treatment temperature, complex irregular shapes with large fractal dimensions are formed on the metal film 2.

The heat treatment temperature of the metalized film 5 may be 150 to 180° C. By setting the heat treatment temperature of the metalized film 5 to 150 to 180° C., the base may contract and irregularities can be formed on the metal film 2. In a case where the heat treatment temperature is 180° C. or higher, the base may undergo deformation and variations in a thickness of the dielectric film 1 may become large, which may have concerns about a decrease in a breakdown voltage.

The metal film 2 may be patterned as needed. A laser marking machine or a laser trimming machine capable of forming insulation slits by vaporizing the metal vapor-deposited film is used to pattern the metal film 2. Any one of a green laser, a YAG laser, and a $CO_2$ laser may be used as the laser. A width of the insulation slits may be 0.01 to 0.20 mm. By setting the width of the insulation slits to 0.01 to 0.20 mm, gas releasing performance can be ensured.

Subsequently, the metalized film 5 provided with irregularities by the heat treatment together with the base is subject to slit processing to have a desirable width. The base is later separated from the metalized film 5. Two metalized films 5 (5a, 5b) each having the metal film 2 (2a, 2b) on one surface form one set. As shown in FIG. 1A, the two metalized films 5 slightly shifted from each other in the width direction (x direction) are laminated and wound around the winding core 7. A wound body is thus obtained. The wound body may be used as the main body portion 3. The winding core 7 may be removed from the wound body to flatten the main body portion 3 by heat processing when a need arises. The laminate body obtained by cutting the wound body may be used as the main body portion 3.

The film capacitor A is obtained by forming metallikon electrodes which are the external electrodes 4 on the both end faces of the main body portion 3 in the x direction as the first direction thus obtained. For example, metal spraying, sputtering, or plating may be used as a method of forming the external electrodes 4.

After the external electrodes 4 are formed, a surface of the main body portion 3 may be covered with an exterior member (not shown) when a need arises.

Examples of a material of the metal film 2 include metal such as (Al) and zinc (Zn), and alloy thereof.

A material of the metallikon electrodes is at least one of metal materials selected from zinc, aluminum, copper, and solder.

Second Embodiment

Figure 4:
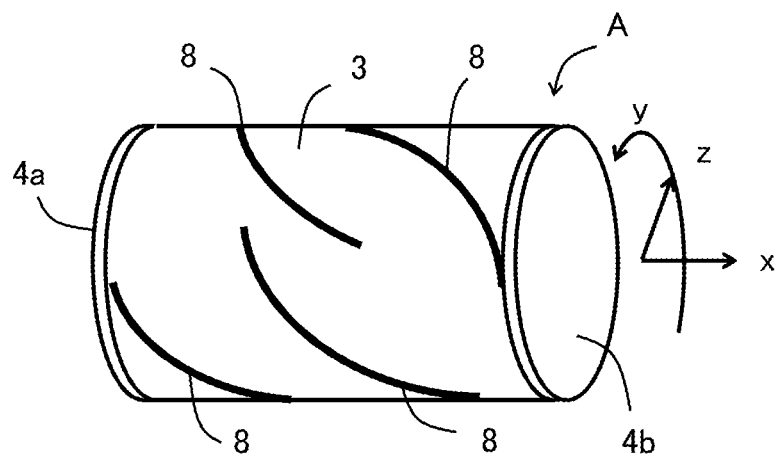
FIG. 4 is a perspective view schematically showing a film capacitor of a second embodiment.
Figure 5A:
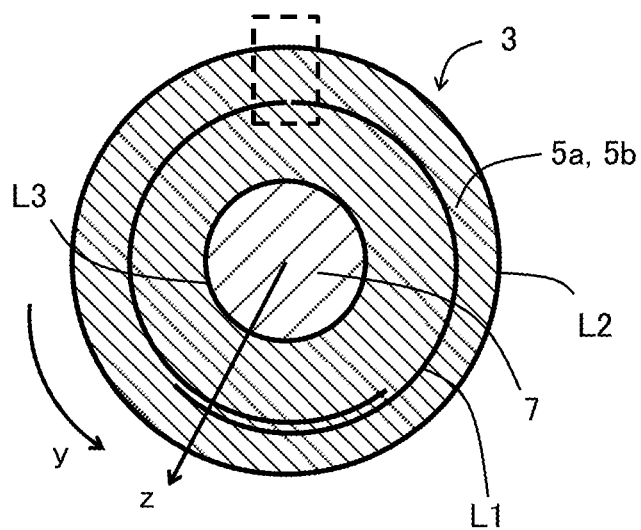
FIG. 5A is a sectional view of a main body portion of the second embodiment taken perpendicularly to an axial length direction thereof.
Figure 5B:
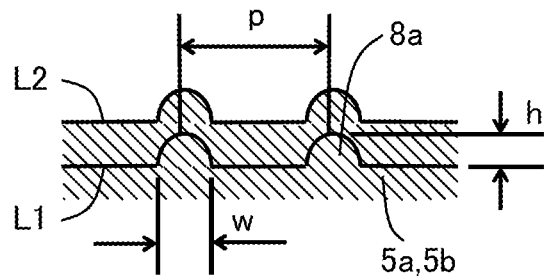
FIG. 5B is an enlarged sectional view of an example of a portion enclosed by a broken line in FIG. 5A.
Figure 5C:
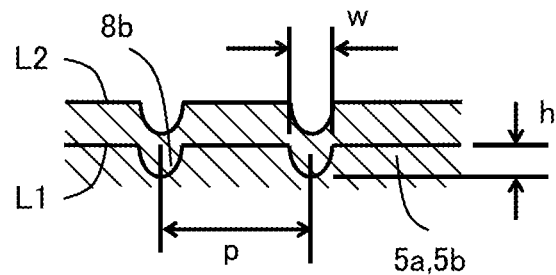
FIG. 5C is an enlarged sectional view of another example of the portion enclosed by the broken line in FIG. 5A.

FIG. 4 is a perspective view schematically showing an outer appearance of a second embodiment of the film capacitor A. FIGS. 5A through 5C are sectional views of a main body portion 3 taken perpendicularly to an axial length direction (x direction).

In the present embodiment, as shown in FIG. 4 and FIGS. 5A to 5C, projections or recesses are provided to at least an inner wound surface L1 of the main body portion 3. The term "wound surface L1" means a surface of a wound metalized film 5, and as shown in FIG. 5A, it means an outer surface of the main body portion 3 in a radial direction (z direction) thereof.

The projections or the recesses may be provided not only to the inner wound surface L1 but also to an outer peripheral surface L2 of the main body portion 3. Hereinafter, projections provided to the inner wound surface L1 or the outer peripheral surface L2 of the main body portion 3 will be referred to as first projections 8a, and recesses provided to the inner wound surface L1 or the outer peripheral surface L2 of the main body portion 3 will be referred to as first recesses 8b. In FIG. 4, reference numeral 8 collectively denotes both of the first projections 8a and the first recesses 8b on the outer peripheral surface L2.

The first projections 8a or the first recesses 8b extend in the axial length direction (x direction) of the main body portion 3. It can be also said that the first projections 8a or the first recesses 8b form ruffles in the x direction. The term "ruffles" means a sheet folded in an elongated shape, for example, narrow pleats of fabric, and may be rephrased as drapes or elongated wrinkles.

A pressure induced by the winding is applied to a wound dielectric film. By providing the first projections 8a or the first recesses 8b as described above in at least the inner wound surface L1 of the main body portion 3, a portion in which a pressure is lower than in the other portions is present in the first projections 8a or the first recesses 8b, or in the vicinity of the first projections 8a or the first recesses 8b.

A gas is produced when a short circuit occurs in an insulation defect portion of the dielectric film 1 and a metal film 2 in the vicinity of the defect portion evaporates and spatters due to energy of the short circuit. In the present embodiment, a low-pressure portion is present in the first projections 8a or the first recesses 8b or in the vicinity thereof. Hence, the gas produced in the insulation defect portion diffuses through the low-pressure portion and is therefore readily released to the outside of the main body portion 3. In the present embodiment, by improving gas releasing performance in this manner, a self-healing property of the film capacitor A can be enhanced.

At least one of the first projections 8a or the first projections 8b may extend from a center of the main body portion 3 in the axial length direction (x direction) to at least one end thereof. When the first projections 8a or the first recesses 8b of the main body portion 3 extends from the center to the end of the main body portion 3 in the axial length direction (x direction), even if a gas is produced due to an occurrence of an insulation defect at the center in the axial length direction (x direction), the gas can be quickly released to the outside of the main body portion 3 through the first projections 8a or the first recesses 8b.

FIG. 5B and FIG. 5C are enlarged sectional views of a portion enclosed by a broken line in FIG. 5A. In FIG. 5B and FIG. 5C, for convenience, the outer peripheral surface L2 and the inner wound surface L1 are shown as flat. Also, dimensions of the first projections 8a and the first recesses 8b and thicknesses of the metalized films 5a and 5b in FIG. 5B and FIG. 5C do not reflect actual dimensions.

As shown in FIG. 5B and FIG. 5C, a width of the first protrusions 8a or a width of the first recesses 8b is defined as w. Then, the width w of the first projections 8a or the first recesses 8b is preferably in a range of 0.05 mm or more and 2 mm or less. By setting the width w of the first projections 8a or the first recesses 8b to such a range, gas releasing performance can be ensured and the film capacitor A can have an excellent self-healing property. A diameter of the main body portion 3 is increased by having the first protrusions 8a or the first recesses 8b. However, by setting the width w of the first projections 8a or the first recesses 8b to 2 mm or less, the main body portion 3 can have a diameter which causes no trouble in practical use.

Also, a height of the first protrusions 8a or a depth of the first recesses 8b is defined as h. Then, the height h of the first protrusion 8a or the depth h of the first recesses 8b is preferably in a range of 0.01 mm or more and 1 mm or less. By setting the height h of the first projections 8a or the depth h of the first recesses 8b to such a range, gas releasing performance can be ensured and the film capacitor A can have an excellent self-healing property.

The diameter of the main body portion 3 is increased by having the first projections 8a or the first recesses 8b. In this time, by setting the height h of the first projections 8a or the depth h of the first recesses 8b to 1 mm or less, the main body portion 3 can have a diameter which causes no trouble in practical use.

The main body portion 3 may include at least one first projection 8a or at least one first recess 8b. In a case where the main body portion 3 includes only one first projection 8a or only one first recess 8b, the first projection 8a or the first projection 8b may extend from one end to the other end of the main body portion 3 in the axial length direction (x direction).

The main body portion 3 may include a plurality of first projections 8a or a plurality of first recesses 8b. Alternatively, the main body portion 3 may include both of the first projection 8a and the first recess 8b. In a case where the main body portion 3 includes the plurality of first projections 8a or the plurality of first recesses 8b, some of the first projections 8a or the first recesses 8b may extend to at least one end in the axial length direction (x direction) of the main body portion 3.

In a case where the main body portion 3 includes the plurality of first projections 8a or the plurality of first recesses 8b, an interval between one first projection 8a and another adjacent first projection 8a or between one first recess 8b and another adjacent first recess 8b in a circumferential direction (y direction) of the main body portion 3 is defined as p (see FIG. 5B and FIG. 5C). Then, p may be set to a range of 0.1 mm or more and 10 mm or less.

By setting the interval p between the plurality of first projections 8a, between the plurality of first recesses 8b, or between the first projection 8a and the first recess 8b to 10 mm or less, gas releasing performance of the entire main body portion 3 can be ensured. The film capacitor A can thus have an excellent self-healing property.

The presence of many first projections 8a or many first recesses 8b on an outer periphery of the main body portion 3 increases the diameter of the main body portion 3. In this time, by setting the interval p to 0.1 mm or more, the main body portion 3 can have a diameter which causes no trouble in practical use.

The first projection 8a or the first recess 8b as described above is preferably formed by bending metalized films 5a and 5b (dielectric films 1a and 1b and metal films 2a and 2b). By forming the first projection 8a or the first recess 8b by bending the metalized films 5a and 5b, a slight clearance is left between the metalized films 5a and 5b and a low-pressure portion is formed in the first projection 8a or the first recess 8b or in the vicinity thereof. A gas produced by evaporation of the metal film 2 diffuses through the slight clearance (low-pressure portion) and a self-healing property of the film capacitor A can be enhanced.

In particular, in a case where polyarylate (PAR) is used as a material of the dielectric film 1, adhesion between films is high so that a gas is not likely to evaporate easily from the margin 6. By providing the first projection 8a or the first recess 8b as described above in the film capacitor A using such a dielectric film 1, an effect of enhancing the self-healing property further markedly can be obtained.

In a case where the first projection 8a or the first recess 8b is formed by changing a thickness of the metalized films 5a and 5b (the dielectric films 1a and 1b and the metal films 2a and 2b), a slight clearance (low-pressure portion) described above is less prone to be formed. Hence, a contribution to the self-healing property of the film capacitor A becomes smaller.

The first projection 8a or the first recess 8b may be formed at a same position in each wound layer or may be formed at a different position from one wound layer to another.

A shape of the first projection 8a or the first recess 8b as described above may be confirmed by cutting the film capacitor A perpendicularly or parallel to the axial length direction (x direction) and observing the cross section. Alternatively, the shape may be confirmed by unwinding the metalized film 5 wound around the main body portion 3 to expose the inner wound surface L1. Further, a state of the irregularities left on the surface of the unwound metalized film 5 may be confirmed.

Figure 6A:
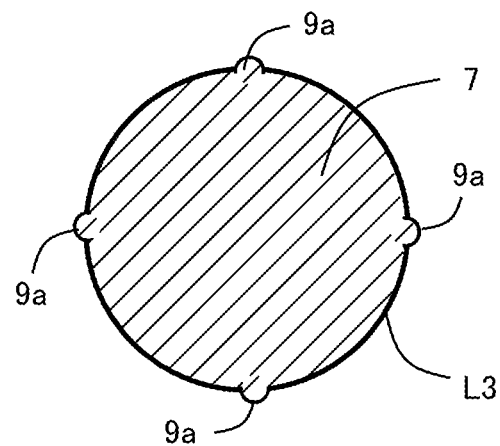
FIG. 6A is a sectional view of a winding core of another example of the second embodiment taken perpendicularly to an axial length direction thereof and corresponds to FIG. 5B.
Figure 6B:
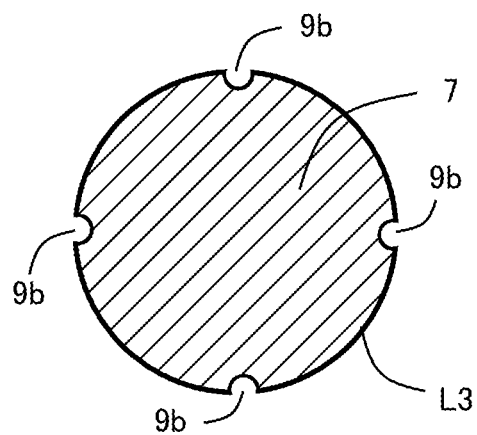
FIG. 6B is a sectional view of a winding core of still another example of the second embodiment taken perpendicularly to the axial length direction and corresponds to FIG. 5C.

As shown in FIG. 5A, the main body portion 3 may be formed by winding the metalized films 5a and 5b around a winding core 7. The winding core 7 may have second projections 9a (see FIG. 6A) or second recesses 9b (see FIG. 6B) on its outer peripheral surface L3. The second projections 9a or the second recesses 9b may be of a linear shape extending in an axial length direction (x direction) of the winding core 7 (or the main body portion 3).

By winding the metalized films 5a and 5b around the winding core 7 which has the second projections 9a or the second recesses 9b on the outer peripheral surface L3, the first projections 8a or the first recesses 8b are formed on wound surfaces L1 of the metallized films 5a and 5b at positions corresponding to the second projections 9a or the second recesses 9b. A vicinity of the first projection 8a, or the first recess 8b forms a portion in which a pressure is lower than in the other portions.

By forming the second projection 9a or the second recess 9b on the outer peripheral surface L3 of the winding core 7, the first projection 8a or the first recess 8b can be formed as desired more readily on the inner wound surface L1 of the main body portion 3 than in a case where the winding core 7 having no irregularities on the outer peripheral surface L3 is used.

Figure 6C:
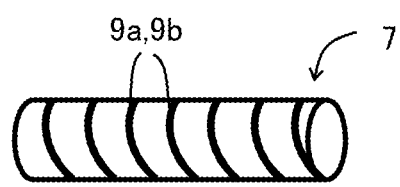
FIG. 6C is a perspective view of a winding core of yet another example of the second embodiment.

The second projection 9a and the second recess 9b may be of a helical shape. The term "helix" means a curve headed from one bottom to the other bottom of a cylindrical column (axial length direction x) while turning along a side surface of the cylindrical column, and is also called a spiral (see FIG. 6C). The first projection 8a and the first recess 8b on the outer peripheral surface L2 of the main body portion 3 may be also of a helical shape.

By forming the second projection 9a or the second recess 9b (first projection 8a or the first recess 8b) in a helical shape, gas releasing performance of the entire main body portion 3 can be improved. Hence, satisfactory gas releasing performance can be ensured independently of a location of an insulation defect portion in the dielectric film 1. The film capacitor A can thus have a further satisfactory self-healing property.

By winding the metalized film 5 around the winding core 7 having the second projection 9a or the second recess 9b on the outer peripheral surface L3, the main body portion 3 including the first projection 8a or the first recess 8b on the wound surface L1 (further on the outer peripheral surface L2) can be obtained. A shape of the second projection 9a or the second recess 9b of the winding core 7 is substantially reflected to a shape of the first projection 8a or the first recess 8b of the main body portion 3. Hence, the width w, the height (depth) h, and the interval p of the first projections 8a or the first recesses 8b of the main body portion 3 can be adjusted by adjusting a shape of the second projection 9a or the second recess 9b of the winding core 7.

In a case where the metalized film 5 is wound around the winding core 7 having neither the second projection 9a nor the second recess 9b on the outer peripheral surface L3, that is, the winding core 7 having no irregularities on the outer peripheral surface L3, a procedure as follows may be taken.

That is, when the metalized film 5 is wound around the winding core 7, a touch roll is normally brought into contact with the wound surface L1 of a wound body to flatten the wound surface L1 and the outer peripheral surface L2 of the main body portion 3. The touch roll is normally used to reduce a clearance between the metalized films 5a and 5b. By using a touch roll having an irregular pattern on its outer peripheral surface as the touch roll normally used as described above, the first projection 8a or the first recess 8b can be formed on the wound surface L1 (further on the outer peripheral surface L2) of the main body portion 3.

The first projection 8a or the first recess 8b can be formed and a shape can be adjusted also by adjusting a winding speed and tension of the metalized film 5 during the winding.

Third Embodiment

Figure 7:
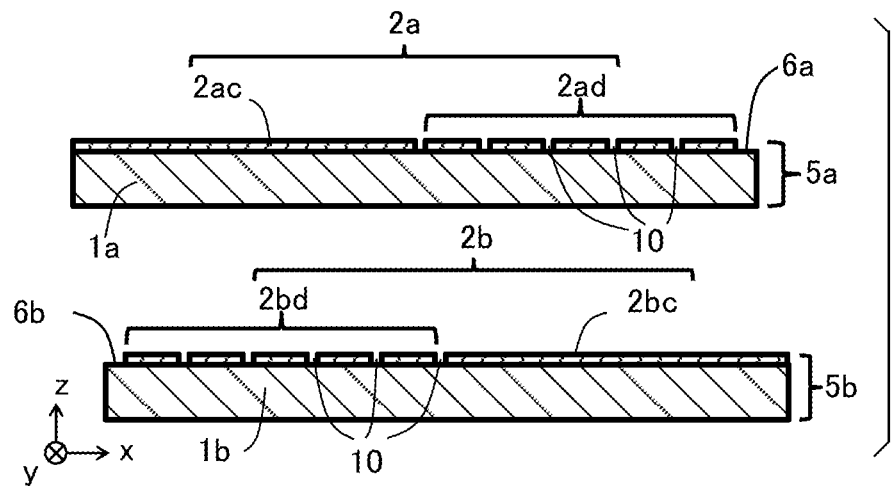
FIG. 7 is a sectional view of a pair of films each with a metal film of a third embodiment taken perpendicularly to a length direction thereof.

In a third embodiment, as shown in FIG. 7, a metal film 2a may include a first portion 2ac connected to an external electrode 4a (not shown) located close to a left end in the x direction and a second portion 2ad located close to a right end, that is, an insulation margin 6a. Likewise, as shown in FIG. 7, a metal film 2b may include a first portion 2bc connected to an external electrode 4b (not shown) located close to a right end in the x direction and a second portion 2bd located close to a left end, that is, an insulation margin 6b. Boundaries between the first portions 2ac and 2bc and the second portions 2ad and 2bd, respectively, are located at substantially a center of a dielectric film 1 in a width direction thereof.

As shown in FIG. 7, the first portions 2ac and 2bc are single continuous metal films whereas the second portions 2ad and 2bd comprises a plurality of small metal films separated by insulation slits 10.

In the third embodiment, as shown in FIG. 7, metallized films 5a and 5b are laminated for the insulation margins 6a and 6b to be positioned, respectively, on different sides of the metalized films 5a and 5b in the width direction (x direction). Also, the metalized films 5a and 5b are laminated while the ends in the width direction (x direction), respectively, having the first portions 2ac and 2bc are shifted to protrude in the width direction (x direction). In such a state, the metalized films 5a and 5b are laminated as shown in FIG. 7, that is, for the first portion 2ac of the metalized film 5a and the second portion 2bd of the metalized film 5b to be placed one above the other and the second portion 2ad of the metalized film 5a and the first portion 2bc of the metalized film 5b to be placed one above the other, and wound as shown in FIG. 1A. A main body portion 3 is thus formed.

Figure 8A:
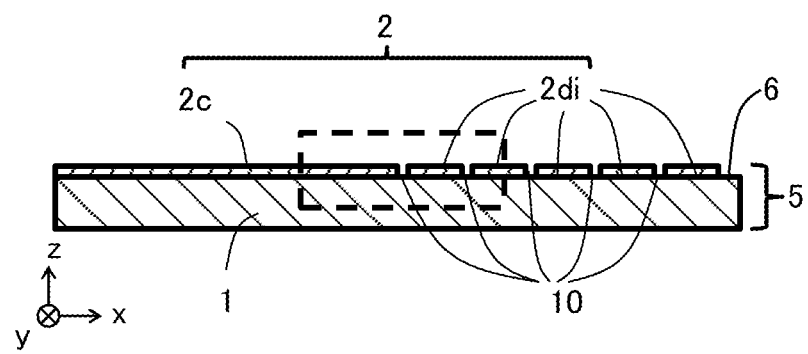
FIG. 8A is a sectional view of a film with a metal film of the third embodiment taken perpendicularly to a length direction thereof.
Figure 8B:
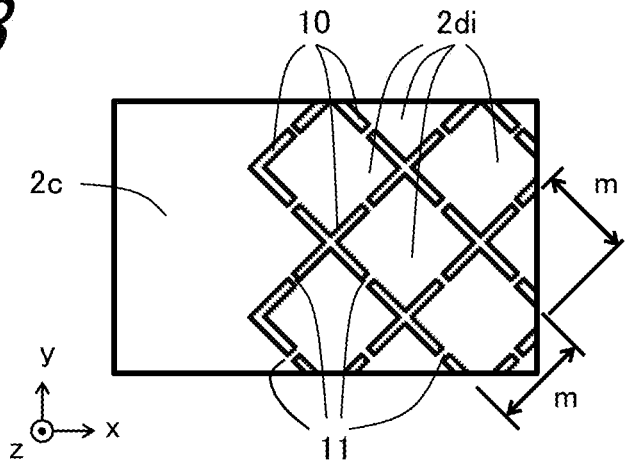
FIG. 8B is an enlarged plan view of the metal film in a portion enclosed by a broken line in FIG. 8A.

The following will describe characteristics of the present embodiment common in the metalized films 5a and 5b and small letters "a" and "b" may be omitted where appropriate as in FIG. 8A and FIG. 8B. For example, reference numeral 2c used in FIG. 8A denotes not only reference numeral 2ac but also reference numeral 2bc of FIG. 7. Also, a sectional view is enlarged in a film thickness direction (z direction) for ease of description.

FIG. 8A is a sectional view of the metalized film 5 taken perpendicularly to a length direction (y direction) and FIG. 8B is an enlarged plan view of a portion enclosed by a broken line in FIG. 8A. As shown in FIG. 8B, the second portion 2d of the metal film 2 comprises a plurality of small metal films 2di separated by the intermittent mesh-like insulation slits 10. Adjacently-located small metal films 2di are connected by a fuse portion 11. Further, the insulation slits 10 are disposed between the first portion 2c and the second portion 2*d*, and the first portion 2*c* and the small metal films 2*di* located adjacent to the first portion 2*c* are connected by the fuse portions 11. The insulation slits 10 can be formed by laser processing.

The small metal film 2*di* is of, for example, a square shape having a side-length of m as shown in FIG. 8B, and an area SA in the case of FIG. 8B is given by m×m. The small metal film 2*di* may be of a shape other than a square shape, for example, a rectangular shape, a diamond shape, or a triangular shape. All of the small metal films 2*di* may be of a same shape or the small metal films 2*di* of a different shape may be included.

In the present embodiment, the area SA of the small metal film 2*di* differs between a vicinity of a center of the main body portion 3 and a vicinity of an outer periphery. Herein, the small metal films 2*di* in the vicinity of the outer periphery of the main body portion 3 are referred to as first small metal films 2*di*(1), and the small metal films 2*di* in the vicinity of the center are referred to second small metal films 2*di*(2) (see FIG. 9A and FIG. 9B, respectively). Here, an average of areas of single first small metal films 2*di*(1) is defined as SA1, and an average of areas of single second small metal films 2*di*(2) is defined as SA2. Then, it is preferable that SA2 is smaller than SA1 (SA2<SA1) in the third embodiment.

The center of the main body portion 3 means a winding axis of the main body portion 3. The vicinity of the center of the main body portion 3 means an effective layer where a capacitance is induced by a voltage applied between the metal films 2*a* and 2*b* in the wound layers of the metalized films 5*a* and 5*b* which are laminated and wound, which is also an innermost wound layer (inner layer thereof) and a vicinity thereof.

Figure 10:
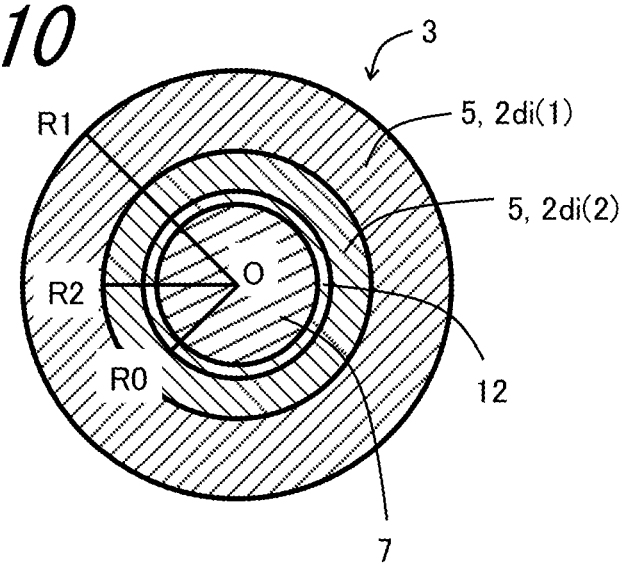
FIG. 10 is a sectional view of a film capacitor of the third embodiment taken perpendicularly to an axial length direction.

For example, in FIG. 10 showing the metalized film 5 (5*a*, 5*b*) wound around a winding core 7, a wound layer (ineffective layer 12) of the dielectric film 1 not provided with the metal film 2 is provided between the winding core 7 and the metalized film 5. Hence, the metalized film 5 is not in direct contact with the winding core 7. Here, a distance from the winding axis O of the main body portion 3 to an outermost layer of the ineffective layer 12 is defined as R0, and a distance from the winding axis O to an outermost layer of the main body portion 3 is defined as R1. Then, the second small metal film 2*di*(2) is disposed to a wound layer at a distance ranging from R0 to R2 from the winding axis O and the first small metal film 2*di*(1) is disposed to a wound layer at a distance ranging from R2 to R1 from the winding axis O.

In the main body portion 3 after the metalized film 5 is wound, a pressure applied to the metalized film 5 is known to increase with a decrease in distance to the winding axis O. When a large pressure is applied to the metalized film 5, the metalized films 5 (metalized films 5*a* and 5*b*) adhere to each other firmly. Hence, the metal film 2 may be less prone to evaporate in the event of a breakdown and a short circuit may be more likely to occur.

Self-healing energy is proportional to a capacitance (area of the small metal film 2*di*). Accordingly, self-healing energy is reduced by making the area SA of the small metal film 2*di* smaller. Hence, by making the area SA2 of the second small metal film 2*di*(2) in the vicinity of the center of the main body portion 3 smaller, self-healing energy of the metalized film 5 in the vicinity of the center is reduced. That is, even when a large pressure is applied to the metalized film 5 in the vicinity of the center of the main body portion 3, the metal film 2 in an insulation defect portion readily evaporates. Consequently, a short circuit is less prone to occur and the self-healing property is enhanced.

In a case where a pressure applied to the metalized films 5 is large so that the metalized films 5 (metalized films 5*a* and 5*b*) adhere to each other firmly, a produced gas is less prone to be released to the outside of an element even when the metal film 2 evaporates and hence, an insulation failure (decrease of IR) is more likely to occur. By making the area SA of the small metal film 2*di* smaller, a proportion of the insulation slits 10 in the second portion 2*d* is increased, and accordingly, paths through which a gas generated by evaporation of the metal film 2 is to be released are increased. Hence, by making the area SA2 of the second small metal film 2*di*(2) in the vicinity of the center of the main body portion 3 smaller, a produced gas is more readily released to the outside of the element even when a large pressure is applied to the metalized films 5. Consequently, an insulation failure (decrease of IR) is less prone to occur and the self-healing property is enhanced.

In a case where a large pressure is applied to a portion where a breakdown occurred (insulation defect portion), the breakdown tends to propagate not only in the wound layer having the insulation defect portion but also to a plurality of other wound layers. By reducing the self-healing energy by making the area SA of the small metal film 2*di* smaller, propagation of the breakdown to the other wound layers can be regulated even when a large pressure is applied to the insulation defect portion. Consequently, the self-healing property is enhanced.

A ratio of SA2 to SA1 (SA2/SA1) is preferably set to a range of 0.15 to 0.50. In particular, a range of 0.2 to 0.3 is preferable. By setting (SA2/SA1) to 0.50 or less, an enhancing effect of the self-healing property can be obtained. By setting (SA2/SA1) to 0.15 or higher, a sufficient initial capacity can be ensured.

For example, given that the second small metal films 2*di*(2) are disposed to a portion (wound layer) at a distance ranging from R0 to R2 from the winding axis O and the first small metal films 2*di*(1) are disposed to a portion (wound layer) at a distance ranging from R2 to R1 from the winding axis O. A ratio of t2 to t1 (t2/t1) is preferably set to a range of 0.3 to 0.7, in which t1 (=R1−R0) denotes a distance (thickness of the effective layer) from the outermost layer of the ineffective layer 12 to the outer periphery, and t2 (=R2−R0) denotes a thickness of a portion where the second small metal films 2*di*(2) are disposed. In particular, t2/t1 is preferably set to a range of 0.35 to 0.50.

FIG. 10 shows the main body portion 3 having the winding core 7. However, the main body portion 3 may not have the winding core. For example, the main body portion 3 may be formed by removing the winding core 7 after the metalized film 5 is wound around the winding core 7. Further, the main body portion 3 may be flattened after the winding core 7 is removed. The main body portion 3 may not have the ineffective layer 12, in which case t1 and t2 may be set as: t1=R1 and t2=R2.

Figure 9A:
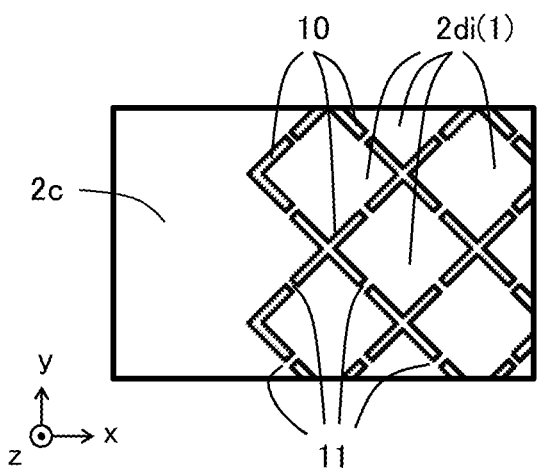
FIG. 9A is an enlarged plan view of the metal film disposed in the vicinity of an outer periphery of a main body portion in the portion enclosed by the broken line in FIG. 8A.
Figure 9B:
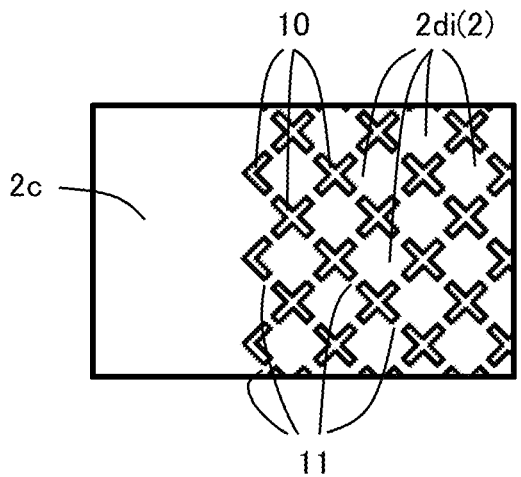
FIG. 9B is an enlarged plan view of the meal film disposed in the vicinity of a center of the main body portion in the portion enclosed by the broken line in FIG. 8A.

The respective metalized films 5 (5*a*, 5*b*) constituting the main body portion 3 preferably have the structures shown in FIG. 9A and FIG. 9B. The respective metalized films 5 (5*a*, 5*b*) are preferably wound for the second small metal films 2*di*(2) to be disposed in the vicinity of the center of the main body portion 3 and the first small metal films 2*di*(1) to be disposed in the vicinity of the outer periphery of the main body portion 3.

Figure 11:
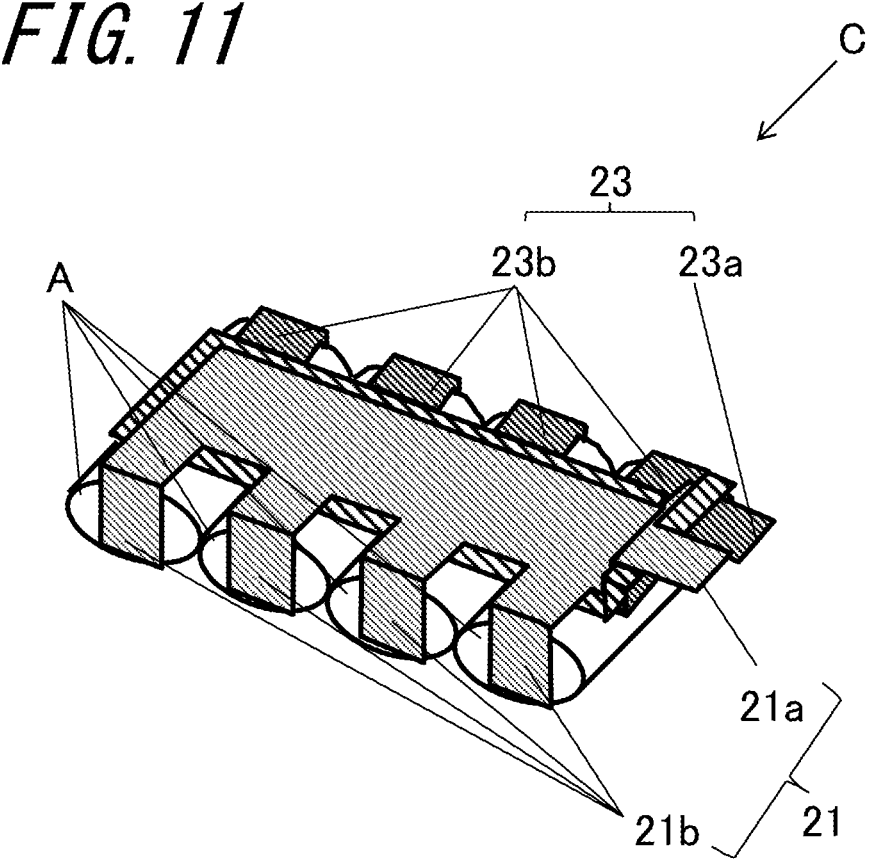
FIG. 11 is a perspective view schematically showing a configuration of a combination type capacitor.

FIG. 11 is a perspective view schematically showing a configuration of one embodiment of a combination type capacitor. In FIG. 11, in order to facilitate understanding of the structure, description of a case and resin covering a capacitor surface are omitted. A combination type capacitor C of the present embodiment is configured such that a plurality of film capacitors A are connected in parallel via a pair of bus bars 21 and 23. The bus bars 21 and 23 include external connection terminal portions 21a and 23a and extraction terminal portions 21b and 23b, respectively. The extraction terminal portions 21b and 23b are connected, respectively, to the external electrodes 4a and 4b of the film capacitors A.

When the above-described film capacitor A is applied to the combination type capacitor C, it is possible to obtain the combination type capacitor C having an excellent self-healing property.

The combination type capacitor C can be obtained by attaching the bus bars 21 and 23 to the external electrodes 4a and 4b of the film capacitors A, respectively, via bonding materials in a state where a plurality of (four in the present embodiment) film capacitors A are juxtaposed.

The film capacitor A and the combination type capacitor C may be formed into a resin-molded (case-molded) capacitor by housing the film capacitor A or the combination type capacitor C in a case and then filling a space in the case with the resin.

The combination type capacitor C shown in FIG. 11 has a structure in which the film capacitors A are juxtaposed in a direction of a major axis of a cross section thereof. A structure in which the film capacitors A are staked in a direction of a minor axis of the cross section thereof may be adopted. Also, the combination type capacitor C shown in FIG. has a structure in which the axial length direction (x direction) is aligned with a horizontal direction. However, the axial length direction (x direction) may be aligned with a vertical direction.

Figure 12:
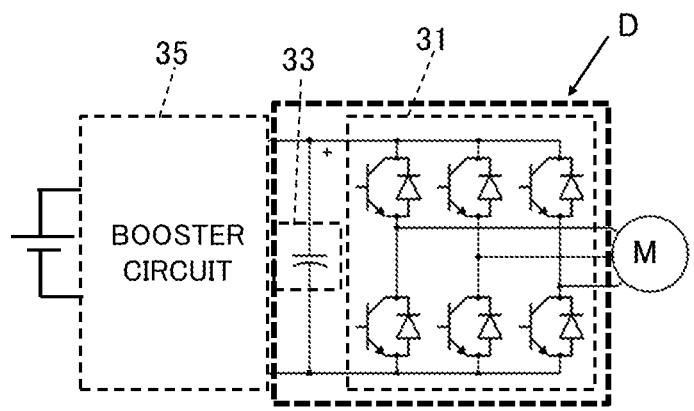
FIG. 12 is a schematic configuration view for explaining a configuration of one embodiment of an inverter.

FIG. 12 is a schematic configuration view used to describe a configuration of one embodiment of an inverter. FIG. 12 shows an example of an inverter D which creates an alternating current from a direct current. As shown in FIG. 12, the inverter D of the present embodiment includes a bridge circuit 31 and a capacitance member 33. The bridge circuit 31 comprises switching elements (for example, IGBTs (Insulated Gate Bipolar Transistors) and diodes. The capacitance member 33 is disposed between input terminals of the bridge circuit for voltage stabilization. The film capacitor A or the combination type capacitor C described above is used as the capacitance member 33.

The inverter D is connected to a booster circuit 35 for boosting a voltage of a DC power supply. The bridge circuit 31 is connected to a motor generator (motor M) which is a drive source.

Figure 13:
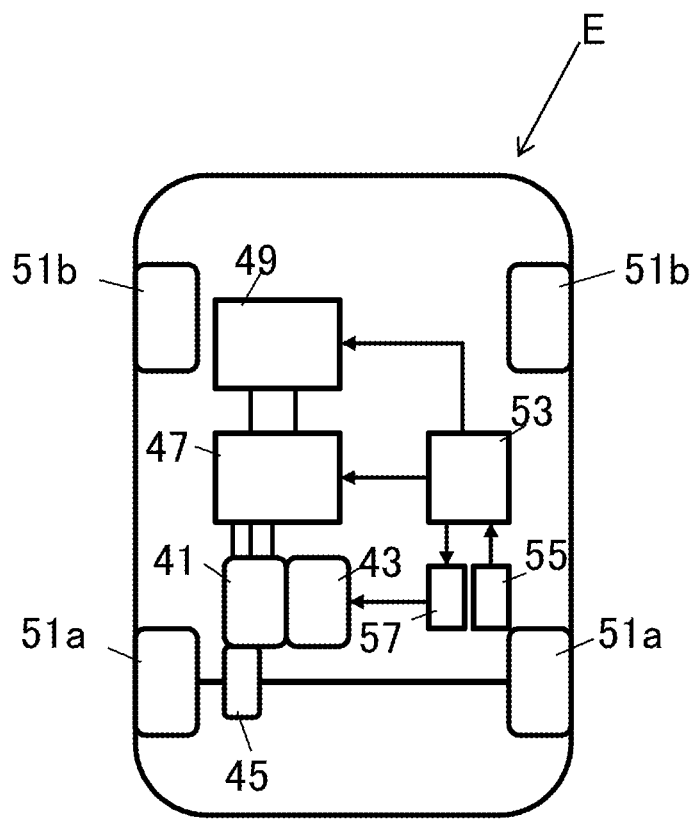
FIG. 13 is a schematic configuration view showing one embodiment of an electric vehicle.

FIG. 13 is a schematic configuration view showing one embodiment of an electric vehicle. FIG. 13 shows an example of a hybrid electric vehicle (HEV) serving as an electric vehicle E.

In FIG. 13, reference numeral 41 denotes a drive motor, reference numeral 43 denotes an engine, reference numeral 45 denotes a transmission, reference numeral 47 denotes an inverter, reference numeral 49 denotes a power supply (battery), and reference numerals 51a and 51b denote a front wheel and a rear wheel, respectively.

The electric vehicle E includes the motor 41 or the engine 43 or both of them serving as a drive source. An output of the drive source is transmitted to a pair of right and left front wheels 51a via the transmission 45. The power supply 49 is connected to the motor 41 via the inverter 47.

The electric vehicle E shown in FIG. 13 includes a vehicle ECU 53 which performs comprehensive control of the entire electric vehicle E. Drive signals from the electric vehicle E are inputted into the vehicle ECU 53. The drive signals from the electric vehicle E are drive signals generated when a driver or the like operates an ignition key 55, a non-illustrated accelerator pedal, a non-illustrated brake, or the like. The vehicle ECU 53 outputs instruction signals to an engine ECU 57, the power supply 49, and the inverter 47 as a load according to the drive signals. The engine ECU 57 controls a rotation speed of the engine 43 in response to the instruction signals to drive the electric vehicle E.

When the inverter D which uses the film capacitor A or the combination type capacitor C of the present embodiment as the capacitance member 33 is mounted on, for example, the electric vehicle E shown in FIG. 13, a capacitance can be maintained over a long period. Consequently, switching noises generated in the inverter 47 or the like can be reduced over a long period. This is attributed to an excellent self-healing property of the film capacitor A or the combination type capacitor C.

The inverter D of the present embodiment can be applied not only to the hybrid electric vehicle (HEV) as described above, but also to an electric vehicle (EV) and a fuel cell vehicle or various power conversion application products, such as an electric bicycle, a power generator, and a solar cell.

EXAMPLES

A cyclo-olefin polymer (COP, molecular weight: Mw=20000, specific permittivity: 2.2) and polyarylate (PAR, U-100, available from UNITIKA Ltd., specific permittivity: 3.1) were prepared as organic resin. Cyclohexane and toluene were prepared as a solvent. A resin solution was prepared by dissolving cyclo-olefin polymer in cyclohexane. Also, another resin solution was prepared by dissolving polyarylate in toluene. The respective resin solutions were applied onto base films made of polyethylene terephthalate (PET) by using a coater and shaped in the form of sheets.

Example I

Among dielectric films (Sample Nos. I-1 to I-9) of cyclo-olefin polymer thus manufactured, Samples Nos. I-1, I-5, I-6, and I-8 were subjected to heat treatment (first heat treatment) at 180° C. to remove cyclohexane. Among dielectric films of polyarylate (Sample Nos. I-10 to I-13), Sample Nos. I-10 and I-12 were subjected to heat treatment (first heat treatment) at 130° C. to remove toluene.

The dielectric films of Sample Nos. 5 and 6 were pressed against metal rollers heated to 180° C. and having irregularities on respective surfaces and irregularities were formed on film surfaces by rotating the metal rollers. The metal rollers used for Sample Nos. I-5 and I-6 had different pitches.

A metalized film was obtained by forming a metal film (Al metal film) chiefly made of aluminum on one surface of each dielectric film by a vacuum vapor deposition method. The metal film was shaped to a size of 300 mm×10 mm by using a metal mask. In Sample Nos. I-1 to I-6, a thickness of the metal film was 70 nm and sheet resistance was 3.0Ω/□. In Sample Nos. I-7 to I-13, a thickness of the metal film was 14 nm and sheet resistance was 21Ω/□. The thickness of the metal film was obtained by observing a cross section of the metalized film subjected to ion milling by a scanning electron microscope (SEM). Sheet resistance (Rs) of the metal film was calculated by measuring a resistance value (R) between both ends of a region having a width (W) of 10 mm and a length (L) of 300 mm in the metal film by a two-terminal method and in accordance with an equation: Rs=R×W/L.

The metalized films of Sample Nos. I-2 to I-4, I-7, I-9, I-11, and I-13 were subjected to heat treatment (second heat treatment) at temperatures shown in Table 1 under tension to remove the solvent. By the second heat treatment, wrinkles extending in the length direction were formed on the metal films of these samples.

The obtained metalized films were cut in a size of 300 mm×11.5 mm, and metalized films having a margin of 300 mm×1.5 mm were thus obtained.

Average thicknesses of the dielectric films after the heat treatment are shown in Table 1. The average thickness of each dielectric film was determined by cutting out a part of the dielectric film, measuring thicknesses of ten equally divided regions of the cut-out part, and determining an average of the measured thicknesses.

The surface roughness Sa of the metal film of the metalized film was measured by using an atomic force microscope (AFM). A sign and a value of the surface roughness S1 in the width direction (x direction) or the surface roughness S2 in the length direction (y direction) whichever was the larger was shown in Table 1. When S1 and S2 had no significant difference, an average of S1 and S2 was shown with a sign "—".

For the metal films having irregularities (Sample Nos. 1-2 to I-7, I-9, I-11, and I-13), irregularity pitches in the width direction (x direction) were measured by using irregularity images obtained by the AFM. Also, images of irregularity boundary lines were obtained by applying image processing to the irregularity images obtained by the AFM. Fractal dimensions were calculated by applying the box counting method to the respective irregularity boundary lines thus obtained. Box sizes used herein were 2, 3, 4, 6, 8, 12, 16, 32, and 64. Clear irregularity boundary lines could not be obtained in a case where the surface roughness Sa was 10 nm or less, and hence, an average irregularity pitch was indicated as "N/M (Not Measurable)" and the fractal dimension was indicated as "N/C (Not Calculable)".

Slipperiness of the metalized films was evaluated as follows. That is, two metalizes films and two metal plates having a size of 10 mm×20 mm were prepared first. One metalized film was laminated by laminating the dielectric film to one metal plate with a double-sided adhesive tape. The other metal film was laminated by laminating the metal film to the other metal plate with a double-sided adhesive tape. The two metalized films laminated to the respective two metal plates were laminated so that the metal film and the dielectric film were opposed to each other and moved in different directions at a constant speed by using an autograph. Loads were adjusted in five steps from 10 gf to 500 gf. Under any load, samples with a moving width of less than 2 mm were evaluated as (I), samples with a moving width of 2 to 4 mm were evaluated as (II), and samples with a moving width of over 4 mm were evaluated as (III). Each Sample No. had ten samples. In Table 1, when six or more out of ten samples were evaluated as (I), "C" indicating no slipperiness was shown, when six or more out of ten samples were evaluated as (III), "A" indicating satisfactory slipperiness was shown, and "B" was shown for the rest.

Two metallized films formed one set, the two metallized films were laminated so that the metal films were opposed to each other via the dielectric film and wound, and thus a wound body is manufactured. The wound body (main portion) was obtained by winding a pair of the metalized films while the metalized films were shifted from each other in the width direction (x direction) and the insulation margins were disposed on different sides in the width direction (x direction), respectively. The metallikon electrodes were formed by thermal-spraying alloy of zinc and tin to opposing end faces of the main body portion where the metal films were exposed, and thus a film capacitor was manufactured.

(Evaluation)

A breakdown field value in a DC (DC-BDE) was evaluated according to a value determined by dividing a breakdown voltage value (DC-BDV) by a thickness of the dielectric film. A breakdown voltage in Example I was obtained by performing a boost test in which a DC voltage was applied to the film capacitor from 0 V at a boost speed of 10 V per second using an insulation resistance tester, and defining a voltage value immediately before a capacitance between counter electrodes decreases from 0 V by 5% or more as the breakdown voltage. In a case where a leak current caused by a short circuit was confirmed in the boost test of the voltage, the capacitance was measured using an LCR meter after the voltage was reset to 0 V. The capacitance was measured under conditions: AC 10 V and 1 kHz. The film capacitor was broken up after the DC-BDE evaluation and a fracture origin was observed.

TABLE 1

| Sample No. | Dielectric Film Average Thickness μm | Heat Treatment Condition[*1] First Treatment Temp. °C. | Second Treatment Temp. °C. | Metal Film Surface Roughness Sa[*2] — | Metal Film Surface Roughness Sa[*2] nm | Metal Film Average Irregularity Pitch μm | Metal Film Fractal Dimension — | Slipperiness — | Breakdown Electric Field DC-BDE V/μm |
|---|---|---|---|---|---|---|---|---|---|
| I-1 | 4.2 | 180 | — | — | 1.5 | N/M | N/C | C | 0 |
| I-2 | 4.2 | — | 150 | S1 | 100 | 7.7 | 1.08 | A | 620 |
| I-3 | 4.2 | — | 165 | S1 | 90 | 10 | 1.19 | A | 625 |
| I-4 | 4.2 | — | 180 | S1 | 83 | 7.1 | 1.23 | A | 704 |
| I-5 | 4.2 | 180 | — | S1 | 88 | 5.0 | 1.00 | A | 0 |
| I-6 | 4.2 | 180 | — | S1 | 85 | 50 | 1.00 | C | 0 |
| I-7 | 4.2 | — | 180 | S1 | 20 | 0.01 | 1.22 | A | 689 |
| I-8 | 0.7 | 180 | — | — | 1.3 | N/M | N/C | C | 0 |
| I-9 | 0.7 | — | 180 | S1 | 22 | 0.01 | 1.21 | A | 696 |
| I-10 | 3.0 | 130 | — | — | 1.5 | N/M | N/C | C | 0 |
| I-11 | 3.0 | — | 180 | S1 | 14 | 0.01 | 1.22 | A | 632 |
| I-12 | 2.5 | 130 | — | — | 1.5 | N/M | N/C | C | 0 |
| I-13 | 2.5 | — | 180 | S1 | 15 | 0.01 | 1.22 | A | 621 |

[*1]First treatment means heat treatment before vapor deposition of metal film and second treatment means heat treatment after vapor deposition of metal film.
[*2]Value of S1 (width direction) or S2 (length direction) whichever is the larger is shown. When S1 and S2 have no significant difference, an average value is shown with a sign (—).

From the result of Table 1, Sample Nos. I-2 to I-4, I-7, I-9, I-11, and I-13 had satisfactory slipperiness, and the DC-BDE of the film capacitor was relatively high. In particular, the DC-BDE is the highest in Sample No. I-4 which had the largest fractal dimension.

On the contrary, Sample Nos. 1-1, 1-8, 1-10, and 1-12 which had small irregularities (not measurable) and Sample No. I-6 which had a large irregularity pitch had poor slipperiness, and the DC-BDE of the film capacitor was low. The DC-BDE of the film capacitor was also low in Sample No. I-5 which had a small fractal dimension.

After an observation of the fracture origin, fractures occurred intensively in a portion where distortion caused by heat pressing was large in Sample Nos. I-1, I-6, and I-8 and fractures occurred unevenly in line along a flow direction in Sample No. 5. As with Sample No. I-5, fractures also occurred unevenly in line along a flow direction in Sample No. I-2. However, the number of the fractures was quite small. On the contrary, fracture origins were scattered in Sample Nos. I-3, I-4, I-7, I-9, I-11, and I-13 and the DC-BDE remained the same as the DC-BDE of the dielectric film before the winding.

Example II

The dielectric film of Sample No. I-10 manufactured in Example I was separated from the base and subjected to slit processing to have a width of 130 mm. Subsequently, an Al metal film as the metal film was formed on one or both of main surfaces of the dielectric film by the vacuum vapor deposition method. A width of the Al metal film was adjusted to 97 mm using a metal mask.

Subsequently, the metal film was patterned using a green laser marker under laser irradiation conditions: an output of 4 W, a frequency of 140 kHz, and a scan speed of 4 m/sec.

The metalized film having a width of 130 mm was further subjected to slit processing to form a metalized film having a width of 50 mm and an insulation margin of 1.5 mm.

Example II-1

A cylindrical column made of polypropylene (PP) and having an outer diameter of 5 mm and a length of 50 mm was used as the winding core. A pair of metalized films having a width of 50 mm was laminated so that the metal films were opposed to each other via the dielectric film and wound around the winding core, And thus a wound body was manufactured. A winding speed was 200 rpm and tension during the winding was 2.0 N.

Example II-2

A cylindrical column made of polypropylene (PP) and having an outer diameter of 5 mm and a length of 50 mm and provided with a helical second protrusion (width: 1.0 mm, height: 0.1 mm) on its outer surface was used as the winding core. A pitch of the second protrusion was 10 mm in the axial length direction (x direction).

A pair of metalized films having a width of 50 mm was laminated so that the metal films were opposed to each other via the dielectric film and wound around the winding core, and thus a wound body was manufactured. A winding speed was 100 rpm and tension during the winding was 0.5 N.

Comparative Example

A cylindrical column made of polypropylene (PP) and having an outer diameter of 5 mm and a length of 50 mm was used as the winding core. A pair of metalized films having a width of 50 mm was layered so that the metal films were opposed to each other via the dielectric film and wound around the winding core, and thus a wound body was manufactured. A winding speed was 100 rpm and tension during the winding was 0.5 N.

A pair of the metalized films is wound while the metalized films were shifted from each other by 0.5 mm in the width direction (x direction) and the insulation margins were disposed on different sides in the width direction (x direction), respectively, and thus a cylindrical wound body (main body portion) was obtained. The metalized films were wound 100 times.

Metallikon electrodes which were the external electrodes were formed by thermal-spraying alloy of zinc and tin to opposing end faces of the wound body (main body portion) where the metal films were exposed, and thus a film capacitor was obtained.

(Evaluation)

The manufactured film capacitors were evaluated as to the presence or absence and a shape of the first projections. A shape of the first projections was measured by transferring an outer shape of the manufactured wound body to silicon-based rubber and using a cross section of the shape thus obtained. A state of the inner wound surface of the main body portion was confirmed by cutting the film capacitor and observing a cross section after other evaluations end.

A diameter of the film capacitor was measured using a caliper. A center portion of the film capacitor in the axial length direction (x direction) was measured five times using a caliper, and an average value Dm was determined. The diameter was indicated by a ratio of Dm to a design value Dd, that is, Dm/Dd (%).

A maximum self-healing field strength was determined as an index of the self-healing property of the film capacitor. Firstly, a boost test to apply a DC voltage to the manufactured film capacitor from 0 V at a boost speed of 10 V per second was performed and a voltage when a current as high as or higher than 10 mA flowed was defined as a breakdown voltage of Example II. When the breakdown voltage was measured, insulation resistance of this film capacitor was measured using a digital super-insulation or minute ammeter (DSM-8104 available from HIOKI E E. Corporation). When the film capacitor had a resistance value of 100 MΩ or higher, the film capacitor was evaluated as being in a self-healing state. A maximum value of a breakdown voltage in the self-healing state was divided by a thickness of the dielectric film, and a value thus determined was defined as the maximum self-healing field strength.

Example II-1 and Example II-2 had the first projections on the inner wound surface and the outer peripheral surface of the main body portion. In Example II-1, a dimension of the first projection on the wound surface having half the radius of the outer peripheral surface was w: 0.5 mm, h: 0.05 mm (w: 0.6 mm and h: 0.04 mm on the outer peripheral surface), p: 10 mm, and Dm/Dd: 102%. In Example II-2, a dimension of the first projection on the wound surface having half the radius of the outer peripheral surface was w: 1.1 mm, h: 0.08 mm (w: 1.2 mm, h: 0.06 mm on the outer peripheral surface), a pitch in the axial length direction (x direction): 10 mm, and Dm/Dd: 104%. In Comparative Example, no first projections were formed and the inner wound surface and the outer peripheral surface of the main body portion were smooth and Dm/Dd was 100%.

The maximum self-healing field strength was 230 V/μm in Example II-1 and 350 V/μm in Example II-2, which were markedly improved from 50 V/μm in Comparative Example.

Example III

The dielectric film of Sample No. I-12 manufactured in Example I was separated from the base and subjected to slit processing to have a width of 130 mm. Subsequently, an Al metal film as the metal film was formed on one main surface of the dielectric film by the vacuum vapor deposition method. A width of the Al metal film was adjusted to 97 mm using a metal mask.

Insulation slits as shown in FIG. 8A, FIG. 8B, FIG. 9A, and FIG. 9B were formed in the obtained metal film using a green laser marker under irradiation conditions: an output of 4 W, a frequency of 140 kHz, and a scan speed of 4 m/sec. A size of each of the first small metal films was 2 mm×2 mm and a width of the fuse portion was 0.2 mm. Sizes of the second small metal films were shown in Table 2 and a width of the fuse portion is 0.1 mm.

The film with the metal film having a width of 130 mm was further subjected to slit processing to form a film with the metal film having a width of 50 mm including the first small metal films and the second small metal films Structures (SA2/SA1, t2/t1) of the first small metal films and the second small metal films were shown in Table 2. Sample No. III-1 was formed of the first small metal films alone. Sample Nos. III-4, III-8, and III-11 were formed of the second small metal films alone.

A cylindrical column made of polyphenylene sulfide (PPS) having an outer diameter of 5 mm and a length of 50 mm was used as the winding core. A pair of films each with the metal film having a width of 50 mm was laminated so that the metal films were opposed to each other via the dielectric film. In Sample Nos. III-2 to III-11, the films were wound around the winding core from a portion having the second small metal films, and thus a wound body was manufactured. The wound body (main body portion) was obtained by winding a pair of the films each with the metal film while the films were shifted from each other by 0.5 mm in the width direction (x direction) and the insulation margins were disposed on different sides in the width direction (x direction), respectively. The pair of films each with the metal film was wound 700 times.

Metallikon electrodes which were the external electrodes were formed by thermal-spraying alloy of zinc and tin to opposing end faces of the wound body (main body portion) where the metal films were exposed, and thus a film capacitor was manufactured.

An initial capacitance, a withstand voltage, a capacity maintenance ratio after a withstand voltage test, and insulation resistance of the manufactured film capacitor were measured. A capacitance was measured using an LCR meter under conditions: AC 1 V and 1 kHz. Insulation resistance and a withstand voltage were measured using an insulation resistance meter. The withstand voltage was define as a voltage when a current as high as or higher than 10 mA flowed while a boost test to apply a DC voltage to the film capacitor from 0 V at a boost speed of 10 V per second was performed.

TABLE 2

| Sample No. | Second Small Metal Films mm | SA2/SA1 | t2/t1 | Initial Capacitance µF | Withstand Voltage V | Capacity Maintenance Ratio*3 % | Insulation Resistance Ω |
|---|---|---|---|---|---|---|---|
| III-1 | — | — | 0.00 | 17.1 | 1200 | 86 | 2 × 10$^5$ |
| III-2 | 0.8 × 0.8 | 0.16 | 0.31 | 15.3 | 1200 | 87 | 6 × 10$^7$ |
| III-3 | 0.8 × 0.8 | 0.16 | 0.56 | 14.0 | 1200 | 96 | 1 × 10$^8$ |
| III-4 | 0.8 × 0.8 | — | 1.00 | 9.9 | 1200 | 100 | 2 × 10$^8$ |
| III-5 | 1 × 1 | 0.25 | 0.31 | 15.7 | 1200 | 86 | 2 × 10$^7$ |
| III-6 | 1 × 1 | 0.25 | 0.40 | 15.1 | 1200 | 90 | 5 × 10$^7$ |
| III-7 | 1 × 1 | 0.25 | 0.56 | 14.2 | 1200 | 94 | 2 × 10$^8$ |
| III-8 | 1 × 1 | — | 1.00 | 10.8 | 1200 | 100 | 3 × 10$^8$ |
| III-9 | 1.4 × 1.4 | 0.49 | 0.31 | 16.3 | 1200 | 87 | 3 × 10$^7$ |
| III-10 | 1.4 × 1.4 | 0.49 | 0.56 | 14.9 | 1200 | 92 | 6 × 10$^7$ |
| III-11 | 1.4 × 1.4 | — | 1.00 | 12.5 | 1200 | 95 | 8 × 10$^7$ |

*3 maintenance ratio of capacity after withstand voltage test to initial capacity Sample Nos. III-2, III-3, III-5 to III-7, III-9, and III-10 had a sufficient initial capacitance while a capacity maintenance ratio after the withstand voltage test was high and a decrease in insulation resistance was small, and hence had an excellent self-healing property. On the contrary, insulation resistance decreased markedly after the withstand voltage test in Sample No. III-1, and a self-healing property was not exerted sufficiently. An initial capacitance was small in Sample Nos. III-4, III-8, and III-11.

REFERENCE SIGNS LIST

A: Film capacitor
C: Combination type capacitor
D: Inverter
E: Electric vehicle
1, 1a, 1b: Dielectric film
2, 2a, 2b: Metal film
2c: First portion of metal film
2d: Second portion of metal film
2di: Small metal film
2di(1): First small metal film
2di(2): Second small metal film
3: Main body portion
4, 4a, 4b: External electrode
5, 5a, 5b: Metalized film
6, 6a, 6b: Insulation margin
7: Winding core
8a: Projection, first projection
8b: Recess, first recess
9a: Second projection
9b: Second recess
10: Insulation slit
11: Fuse portion
21, 23: Bus bar
31: Bridge circuit
33: Capacitance member
35: Booster circuit
41: Motor
43: Engine
45: Transmission
47: Inverter 49: Power supply
51a: Front wheel
51b: Rear wheel
53: Vehicle ECU
55: Ignition key
57: Engine ECU
S1: Surface roughness of metal film 2 in the first direction
S2: Surface roughness of metal film 2 in the second direction
SA1: Average area of first small metal film
SA2: Average area of second small metal film

The invention claimed is:

1. A film capacitor, comprising:
a main body portion comprising:
   a dielectric film, and
   a metal film disposed on one surface of the dielectric film, and having surface roughnesses of S1 and S2 where S1 denotes a surface roughness of the metal film in a first direction, and S2 denotes a surface roughness of the metal film in a second direction, the first direction perpendicular to the second direction, S1 greater than S2; and
the main body portion including a pair of ends in the first direction thereof; and
external electrodes disposed on the pair of ends, respectively,
wherein an average value of fractal dimensions of irregularity boundary lines due to wrinkles of the metal film is 1.08 or more.

2. The film capacitor according to claim 1, wherein S1 is 20 nm or more and 100 nm or less.

3. The film capacitor according to claim 1, wherein an average pitch in the first direction of irregularities due to wrinkles of the metal film is 0.01 μm or more and 10 μm or less.

4. The film capacitor according to claim 1, wherein the main body portion is a wound body in which the dielectric film and the metal film are wound, and the main body portion includes at least one first projection or at least one first recess extending in the first direction on at least an inner wound surface of the main body portion.

5. The film capacitor according to claim 4, wherein at least one of the at least one first projection or the at least one first recess extends from a center between the pair of ends in the first direction to at least one end of the pair of ends.

6. The film capacitor according to claim 4, wherein the at least one first projection includes a plurality of first projections, or the at least one first recess includes a plurality of first recesses.

7. The film capacitor according to claim 4, wherein the main body portion includes a winding core including at least one second projection or at least one second recess on an outer peripheral surface of the winding core; and
the at least one second projection or the at least one second recess extends in the first direction.

8. The film capacitor according to claim 7, wherein the at least one second projection or the at least one second recess is of a helical shape.

9. The film capacitor according to claim 1, wherein the main body portion is a wound body in which the dielectric film and the metal film are wound,
the metal film includes a first portion connected to one of the external electrodes at one end of the pair of ends, and a second portion located close to an other end of the pair of ends,
the second portion comprises a plurality of small metal films separated by intermittent mesh-like insulation slits and fuse portions connecting the plurality of small metal films,
the plurality of small metal films include first small metal films located in a vicinity of an outer periphery of the main body portion, and second small metal films located in a vicinity of a center of the main body portion, and
SA2 is smaller than SA1, in which SA1 denotes an average of areas of single first small metal films and SA2 denotes an average of areas of single second small metal films.

10. The film capacitor according to claim 9, wherein a ratio of SA2 to SA1 (SA2/SA1) is in a range of 0.15 or more and 0.50 or less.

11. The film capacitor according to claim 9, wherein a ratio of t2 to t1 (t2/t1) is in a range of 0.3 or more and 0.7 or less, in which t1 denotes a thickness of the main body portion in a portion having the metal film in a winding radial direction, and t2 denotes a thickness in a portion having the second small metal films in the winding radial direction.

12. A combination type capacitor, comprising:
a plurality of film capacitors; and
at least one bus bar connecting all of the plurality of film capacitors,
the plurality of film capacitors comprising the film capacitor according to claim 1.

13. An inverter, comprising:
a bridge circuit comprising switching elements; and
a capacitance member connected to the bridge circuit,
the capacitance member comprising the combination type capacitor according to claim 12.

14. An electric vehicle, comprising:
a power supply;
the inverter according to claim 13, connected to the power supply;
a motor connected to the inverter; and
a wheel driven by the motor.

15. An inverter, comprising:
a bridge circuit comprising switching elements; and
a capacitance member connected to the bridge circuit,
the capacitance member comprising the film capacitor according to claim 1.

* * * * *